(12) United States Patent
Nakane et al.

(10) Patent No.: US 12,204,852 B2
(45) Date of Patent: Jan. 21, 2025

(54) PROOFREADING SUPPORT APPARATUS, PROOFREADING SUPPORT METHOD AND PROOFREADING SUPPORT PROGRAM

(71) Applicant: NIPPON TELEGRAPH AND TELEPHONE CORPORATION, Tokyo (JP)

(72) Inventors: Ai Nakane, Tokyo (JP); Momoko Nakatani, Tokyo (JP); Harumi Saito, Tokyo (JP); Yumiko Matsuura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/999,992

(22) PCT Filed: Jun. 16, 2020

(86) PCT No.: PCT/JP2020/023595
§ 371 (c)(1),
(2) Date: Nov. 28, 2022

(87) PCT Pub. No.: WO2021/255827
PCT Pub. Date: Dec. 23, 2021

(65) Prior Publication Data
US 2023/0205992 A1 Jun. 29, 2023

(51) Int. Cl.
*G06F 40/232* (2020.01)
*G06F 40/253* (2020.01)

(52) U.S. Cl.
CPC .......... *G06F 40/232* (2020.01); *G06F 40/253* (2020.01)

(58) Field of Classification Search
CPC .................................................. G06F 40/232
See application file for complete search history.

(56) References Cited

U.S. PATENT DOCUMENTS 7,081,808 B2 * 7/2006 Colombo ............. G02B 6/3897
398/166
7,162,197 B2 * 1/2007 Kitamura ................ A63H 33/38
715/251

(Continued)

FOREIGN PATENT DOCUMENTS

CN 114881007 A * 8/2022
DE 102008025560 A1 * 12/2009 ......... G06F 17/2229

(Continued)

*Primary Examiner* — Benjamin Smith
(74) *Attorney, Agent, or Firm* — IPUSA, PLLC

(57) ABSTRACT

Provided are a sentence proofreading assistance apparatus, a sentence proofreading assistance method, and a sentence proofreading assistance program for assisting in sentence proofreading when creating a picture book. The sentence proofreading assistance apparatus includes a requirement input unit that receives information on a development level of a target person and information on a purpose of creating a picture book, an acquisition unit that acquires a check content and a rule corresponding to both pieces of information received by the requirement input unit, a sentence analysis unit that analyzes, when receiving a sentence of a picture book to be proofread, the sentence of the picture book, and a proofreading information output unit that checks an analysis result by the sentence analysis unit in accordance with the check content and outputs proofreading information based on the rule for proofreading the sentence.

12 Claims, 9 Drawing Sheets

| PURPOSE OF CREATING PICTURE BOOK \ DEVELOPMENT LEVEL OF CHILD | ONE YEAR OLD | TWO YEARS OLD | THREE YEARS OLD | FOUR YEARS OLD | FIVE YEARS OLD OR OLDER |
|---|---|---|---|---|---|
| DELIGHTING CHILD | DIFFICULTY LEVEL OF SENTENCE IS LOW [CHECK DB-1] | SENTENCE HAS RHYTHMIC SENSE [CHECK DB-17] | DIFFICULTY LEVEL OF SENTENCE IS LOW [CHECK DB-2] | ENTIRE PICTURE BOOK HAS RHYTHMIC SENSE [CHECK DB-18] | DIFFICULTY LEVEL OF SENTENCE IS MODERATE [CHECK DB-3] STORYLINE IS ATTRACTIVE [CHECK DB-19] |
| COMMUNICATING WITH CHILD | ENCOURAGING CHILD'S POINTING WITH FINGER [CHECK DB-4] | ENCOURAGING CHILD'S REPETITION [CHECK DB-5] | ENCOURAGING CHILD'S DISCOVERY AND SPEECH [CHECK DB-6] | ENCOURAGING CHILD'S ASKING QUESTION [CHECK DB-7] | |
| BRINGING OUT CHILD'S ADORABLE APPEARANCE OR THE LIKE | ENCOURAGING CHILD'S ACTION USING HAND [CHECK DB-8] | | ENCOURAGING CHILD'S ACTION USING BODY [CHECK DB-9] | | BRINGING OUT CHILD'S EMOTIONAL MOVEMENT [CHECK DB-10] |
| KNOWING CHILD'S INTERESTS AND CONCERNS | INCLUDING LARGE NUMBER OF THINGS [CHECK DB-11] | | INCLUDING LARGE NUMBER OF CONCEPTS [CHECK DB-12] | | |
| ENCOURAGING AND REALIZING CHILD'S GROWTH AND DEVELOPMENT | INCLUDING LARGE NUMBER OF THINGS AND WORDS [CHECK DB-13] | INCLUDING LONG SENTENCE [CHECK DB-14] | INCLUDING LARGE NUMBER OF THINGS AND CONCEPTS [CHECK DB-15] | | INCLUDING STORY GENERATING EXCHANGE OF FEELING [CHECK DB-16] |

400

(56) References Cited

U.S. PATENT DOCUMENTS

| | | | |
|---|---|---|---|
| 7,890,534 B2* | 2/2011 | Bathiche | G06F 40/151 715/255 |
| 9,336,204 B1* | 5/2016 | Amundsen | G06F 40/40 |
| 9,367,537 B2* | 6/2016 | Dua | G06F 40/30 |
| 9,367,538 B2* | 6/2016 | Dua | G06F 40/40 |
| 10,210,147 B2* | 2/2019 | DeLuca | G06F 16/345 |
| 10,218,653 B2* | 2/2019 | Akselrod | G06N 5/048 |
| 10,241,999 B2* | 3/2019 | Chakra | G06F 40/253 |
| 10,268,682 B2* | 4/2019 | Chakra | G06F 40/253 |
| 10,333,874 B2* | 6/2019 | Barsness | H04L 51/063 |
| 10,474,969 B1* | 11/2019 | Abdi Taghi Abad | G06F 40/30 |
| 10,482,185 B1* | 11/2019 | Abdi Taghi Abad | G06N 20/00 |
| 10,547,578 B2* | 1/2020 | Barsness | H04L 51/063 |
| 10,579,743 B2* | 3/2020 | Astigarraga | G06F 40/40 |
| 10,594,757 B1* | 3/2020 | Shevchenko | G06F 40/253 |
| 10,733,379 B2* | 8/2020 | Bostick | G06F 40/247 |
| 10,764,534 B1* | 9/2020 | Shevchenko | G10L 15/197 |
| 10,771,529 B1* | 9/2020 | Shevchenko | H04L 65/765 |
| 10,897,369 B2* | 1/2021 | Harpur | H04L 12/1822 |
| 10,902,189 B2* | 1/2021 | DeLuca | G06F 40/258 |
| 10,922,483 B1* | 2/2021 | Shevchenko | H04L 65/765 |
| 10,963,626 B2* | 3/2021 | Chiba | G06F 40/232 |
| 11,017,051 B2* | 5/2021 | Pilkington | G06F 16/24578 |
| 11,037,351 B2* | 6/2021 | Hall | H04L 67/06 |
| 11,146,609 B1* | 10/2021 | Shevchenko | H04L 67/306 |
| 11,157,684 B2* | 10/2021 | Chiba | G06F 40/232 |
| 11,205,057 B2* | 12/2021 | Astigarraga | H04L 51/48 |
| 11,228,731 B1* | 1/2022 | Shevchenko | G10L 15/22 |
| 11,258,734 B1* | 2/2022 | Shevchenko | G06V 40/20 |
| 11,316,979 B2* | 4/2022 | Matula | G06N 3/08 |
| 11,321,522 B1* | 5/2022 | Shevchenko | G06F 40/20 |
| 11,321,736 B2* | 5/2022 | Lagi | G06N 20/00 |
| 11,392,665 B2* | 7/2022 | Pilkington | G06F 16/24578 |
| 11,392,853 B2* | 7/2022 | Abdi Taghi Abad | G06Q 30/016 |
| 11,463,500 B1* | 10/2022 | Shevchenko | H04L 65/765 |
| 11,494,566 B2* | 11/2022 | Shah | G06N 20/00 |
| 11,516,158 B1* | 11/2022 | Luzhnica | G06F 40/35 |
| 11,620,566 B1* | 4/2023 | Shevchenko | G06F 40/186 706/12 |
| 11,727,205 B1* | 8/2023 | Shevchenko | G06F 3/048 715/200 |
| 11,763,203 B2* | 9/2023 | Abdi Taghi Abad | G06N 20/00 704/9 |
| 2002/0069225 A1* | 6/2002 | Kitamura | G09B 5/062 715/251 |
| 2004/0054761 A1* | 3/2004 | Colombo | H04L 41/00 340/5.2 |
| 2006/0026244 A1* | 2/2006 | Watson | G06Q 10/107 709/206 |
| 2009/0172022 A1* | 7/2009 | Bathiche | G06F 40/131 |
| 2012/0244509 A1* | 9/2012 | Heroman | G09B 7/00 434/362 |
| 2013/0080471 A1* | 3/2013 | Forte | G06Q 50/20 707/785 |
| 2015/0278175 A1* | 10/2015 | Dua | G06F 40/30 704/9 |
| 2015/0278196 A1* | 10/2015 | Dua | G06F 40/40 704/9 |
| 2015/0286617 A1* | 10/2015 | Chakra | G06F 40/40 704/9 |
| 2015/0286619 A1* | 10/2015 | Chakra | G06F 40/56 704/9 |
| 2015/0309973 A1* | 10/2015 | Brav | G06F 16/93 715/256 |
| 2015/0309986 A1* | 10/2015 | Brav | G06F 16/38 707/739 |
| 2017/0109340 A1* | 4/2017 | Chen | G06F 40/151 |
| 2017/0220536 A1* | 8/2017 | Chiba | G06F 9/453 |
| 2018/0006979 A1* | 1/2018 | Barsness | H04L 51/52 |
| 2018/0067927 A1* | 3/2018 | Gadepalli | G06F 40/263 |
| 2018/0133900 A1* | 5/2018 | Breazeal | B25J 19/026 |
| 2018/0267955 A1* | 9/2018 | Catalano | H04W 4/14 |
| 2018/0285339 A1* | 10/2018 | Bostick | G06F 16/313 |
| 2019/0080018 A1* | 3/2019 | Pilkington | G06F 16/24578 |
| 2019/0273705 A1* | 9/2019 | Barsness | H04L 51/063 |
| 2019/0354566 A1* | 11/2019 | Pilkington | G06F 16/9577 |
| 2020/0065857 A1* | 2/2020 | Lagi | G06Q 30/0254 |
| 2020/0134039 A1* | 4/2020 | Alam | G06F 16/3326 |
| 2020/0143574 A1* | 5/2020 | Hall | G06N 3/08 |
| 2020/0159986 A1* | 5/2020 | Djamasbi | G06F 40/40 |
| 2020/0265184 A1* | 8/2020 | Kargiannakis | G06F 40/30 |
| 2020/0265185 A1* | 8/2020 | Kargiannakis | G06N 5/046 |
| 2020/0272698 A1* | 8/2020 | Abdi Taghi Abad | G06F 40/30 |
| 2021/0126881 A1* | 4/2021 | Ball | G06F 40/216 |
| 2021/0312122 A1* | 10/2021 | O'Donncha | G06F 40/30 |
| 2021/0334472 A1* | 10/2021 | Shah | G06F 40/30 |
| 2022/0046132 A1* | 2/2022 | Matula | G06N 3/006 |
| 2022/0058339 A1* | 2/2022 | Archuleta | G06N 3/084 |
| 2022/0138422 A1* | 5/2022 | Kulkarni | G06N 5/022 704/9 |
| 2022/0222703 A1* | 7/2022 | Lagi | G06F 40/295 |
| 2022/0398499 A1* | 12/2022 | Abdi Taghi Abad | G06F 40/30 |
| 2023/0133392 A1* | 5/2023 | Wang | G06F 40/211 704/9 |
| 2023/0169268 A1* | 6/2023 | Van Hickman | G10L 15/01 704/9 |
| 2023/0245651 A1* | 8/2023 | Wang | G06N 5/022 704/275 |
| 2023/0282130 A1* | 9/2023 | Van Hickman | G09B 19/06 |
| 2023/0297766 A1* | 9/2023 | Mackey | G06N 20/00 715/255 |
| 2023/0325590 A1* | 10/2023 | Shevchenko | G06F 40/253 715/200 |
| 2023/0342550 A1* | 10/2023 | Fujita | G06F 40/284 |
| 2023/0385695 A1* | 11/2023 | Abdi Taghi Abad | G06F 40/47 |
| 2024/0135291 A1* | 4/2024 | Steenstra | G06Q 10/0637 |
| 2024/0145074 A1* | 5/2024 | Steenstra | G06Q 10/103 |

FOREIGN PATENT DOCUMENTS

| | | | |
|---|---|---|---|
| JP | 2011186992 A | * | 9/2011 |
| JP | 2016-152032 | | 8/2016 |

* cited by examiner

Fig. 4

| PURPOSE OF CREATING PICTURE BOOK \ DEVELOPMENT LEVEL OF CHILD | ONE YEAR OLD | TWO YEARS OLD | THREE YEARS OLD | FOUR YEARS OLD | FIVE YEARS OLD OR OLDER |
|---|---|---|---|---|---|
| DELIGHTING CHILD | DIFFICULTY LEVEL OF SENTENCE IS LOW [CHECK DB-1] SENTENCE HAS RHYTHMIC SENSE [CHECK DB-17] | | DIFFICULTY LEVEL OF SENTENCE IS LOW [CHECK DB-2] ENTIRE PICTURE BOOK HAS RHYTHMIC SENSE [CHECK DB-18] | | DIFFICULTY LEVEL OF SENTENCE IS MODERATE [CHECK DB-3] STORYLINE IS ATTRACTIVE [CHECK DB-19] |
| COMMUNICATING WITH CHILD | ENCOURAGING CHILD'S POINTING WITH FINGER [CHECK DB-4] | ENCOURAGING CHILD'S REPETITION [CHECK DB-5] | ENCOURAGING CHILD'S DISCOVERY AND SPEECH [CHECK DB-6] | ENCOURAGING CHILD'S ASKING QUESTION [CHECK DB-7] | |
| BRINGING OUT CHILD'S ADORABLE APPEARANCE OR THE LIKE | ENCOURAGING CHILD'S ACTION USING HAND [CHECK DB-8] | | ENCOURAGING CHILD'S ACTION USING BODY [CHECK DB-9] | | BRINGING OUT CHILD'S EMOTIONAL MOVEMENT [CHECK DB-10] |
| KNOWING CHILD'S INTERESTS AND CONCERNS | INCLUDING LARGE NUMBER OF THINGS [CHECK DB-11] | INCLUDING LONG SENTENCE [CHECK DB-14] | INCLUDING LARGE NUMBER OF CONCEPTS [CHECK DB-12] | | |
| ENCOURAGING AND REALIZING CHILD'S GROWTH AND DEVELOPMENT | INCLUDING LARGE NUMBER OF THINGS AND WORDS [CHECK DB-13] | | INCLUDING LARGE NUMBER OF THINGS AND CONCEPTS [CHECK DB-15] | | INCLUDING STORY GENERATING EXCHANGE OF FEELING [CHECK DB-16] |

| CHECK ITEM | CHECK CONTENT | RULE |
|---|---|---|
| SENTENCE STRUCTURE | CHECK IF COMPLEX SENTENCE IS INCLUDED | IF COMPLEX SENTENCE IS INCLUDED, PRESENT ALERT "SENTENCE IS TOO COMPLEX" |
| | NUMBER OF CLAUSES | IF NUMBER OF CLAUSES IS SEVEN OR MORE, PRESENT ALERT "SENTENCE IS TOO LONG" |

520

| CHECK ITEM | CHECK CONTENT | RULE |
|---|---|---|
| PRESENCE OR ABSENCE OF PARTICULAR WORD | PRESENCE OR ABSENCE OF ADJECTIVE IN SENTENCE | IF ADJECTIVE IS PRESENT, PRESENT EXAGGERATION CANDIDATE WITH ADJECTIVE REPEATED TWICE |
| | PRESENCE OR ABSENCE OF ADVERB IN SENTENCE | IF ADVERB IS PRESENT, PRESENT EXAGGERATION CANDIDATE WITH ADVERB REPEATED TWICE |
| | PRESENCE OR ABSENCE OF "DOG" | IF "DOG" IS PRESENT, PRESENT EXAGGERATION CANDIDATE WITH "BOWWOW" ADDED AFTER WORD |
| | PRESENCE OR ABSENCE OF "CAT" | IF "CAT" IS PRESENT, PRESENT EXAGGERATION CANDIDATE WITH "MEOW MEOW" ADDED AFTER WORD |
| | ... | ... |
| | PRESENCE OR ABSENCE OF "GET ANGRY" | IF "GET ANGRY" IS PRESENT, PRESENT EXAGGERATION CANDIDATE WITH "IN A HUFF" ADDED BEFORE WORD |
| | PRESENCE OR ABSENCE OF "EAT" | IF "EAT" IS PRESENT, PRESENT EXAGGERATION CANDIDATE WITH "HEARTILY" ADDED BEFORE WORD |
| | PRESENCE OR ABSENCE OF "GO THROUGH" | IF "GO THROUGH" IS PRESENT, PRESENT EXAGGERATION CANDIDATE WITH "ON AND ON" ADDED BEFORE WORD |
| | PRESENCE OR ABSENCE OF "GO THROUGH" | IF "GO THROUGH" IS PRESENT, PRESENT EXAGGERATION CANDIDATE WITH "WITH A POP" ADDED BEFORE WORD |
| | ... | ... |
| | PRESENCE OR ABSENCE OF "WARM" | IF "WARM" IS PRESENT, PRESENT EXAGGERATION CANDIDATE WITH "COMFORTABLY" ADDED BEFORE WORD |
| | PRESENCE OR ABSENCE OF "GENTLE" | IF "GENTLE" IS PRESENT, PRESENT EXAGGERATION CANDIDATE WITH "FLUFFILY" |
| ... | ... | ... |

Fig. 8

"THERE IS NO ONE BUT THIS MAN UNDER THE WIDE GATE"

"THERE IS", "NO ONE", "BUT", "THIS", "MAN", "UNDER", "THE WIDE", "GATE"
SIMPLE SENTENCE STRUCTURE, NUMBER OF CLAUSES IS "EIGHT", AND ADJECTIVE IS "WIDE"

ALERT 1: --
ALERT 2: SENTENCE IS TOO LONG.
EXAGGERATION CANDIDATE 1: "THERE IS NO ONE BUT THIS MAN UNDER THE WIDE WIDE GATE"
EXAGGERATION CANDIDATE 2: --

"WHEN GOING THROUGH THE LONG TUNNEL IN THE BORDER, I SAW THE SNOW COUNTRY"

"WHEN GOING THROUGH", "THE LONG", "TUNNEL", "IN THE BORDER", "I SAW", "THE SNOW COUNTRY"
COMPLEX SENTENCE STRUCTURE, NUMBER OF CLAUSES IS "SIX", ADJECTIVE IS "LONG", AND PARTICULAR WORD IS "GOING THROUGH"
ALERT 1: SENTENCE IS COMPLEX.
ALERT 2: --

PROOFREADING SUPPORT APPARATUS, PROOFREADING SUPPORT METHOD AND PROOFREADING SUPPORT PROGRAM

TECHNICAL FIELD

The present disclosure relates to a sentence proofreading assistance apparatus, a sentence proofreading assistance method, and a sentence proofreading assistance program.

BACKGROUND ART

A known technique is to analyze sentences in a picture book and estimate a difficulty level or a target age of the picture book. The technique allows for selecting a picture book suitable for a development level of a child from among existing picture books in accordance with the difficulty level or the target age estimated from an analysis result of a sentence (e.g., a feature such as the number of characters, the number of clauses, or a proportion of hiragana characters or katakana characters in a single sentence).

In addition, applying the technique allows for creating a picture book having proofread sentences to provide features suitable for the difficulty level or the target age.

CITATION LIST

Patent Literature

PTL 1: JP 2016-152032 A

SUMMARY OF THE INVENTION

Technical Problem

On the other hand, to bring a picture book to be created closer to a "good picture book", just proofreading sentences suitable for a difficulty level or a target age is insufficient. This is because a typical "good picture book" provides various effects when a child reads the book (or the book is read to the child), and the effects are not limited to an effect of enabling a child to understand sentences suitable for the difficulty level or the target age.

The present disclosure is directed to providing a sentence proofreading assistance apparatus, a sentence proofreading assistance method, and a sentence proofreading assistance program for assisting in sentence proofreading when creating a picture book.

Means for Solving the Problem

A sentence proofreading assistance apparatus according to an aspect of the present disclosure includes
a requirement input unit that receives information on a development level of a target person and information on a purpose for creating a picture book,
an acquisition unit that acquires a check content and a rule corresponding to the information received by the requirement input unit,
a sentence analysis unit that analyzes, when receiving a sentence of a picture book to be proofread, the sentence of the picture book, and
a proofreading information output unit that checks an analysis result by the sentence analysis unit in accordance with the check content and outputs proofreading information based on the rule for proofreading the sentence.

Effects of the Invention

The present disclosure allows for providing the sentence proofreading assistance apparatus, the sentence proofreading assistance method, and the sentence proofreading assistance program for assisting in sentence proofreading when creating a picture book.

BRIEF DESCRIPTION OF DRAWINGS

FIG. 4 is a diagram illustrating an example of a creation requirement DB.

FIG. 5 is a diagram illustrating an example of a check DB.

FIG. 8 is a diagram illustrating other operation examples of the check processing.

DESCRIPTION OF EMBODIMENTS

Figure 1:
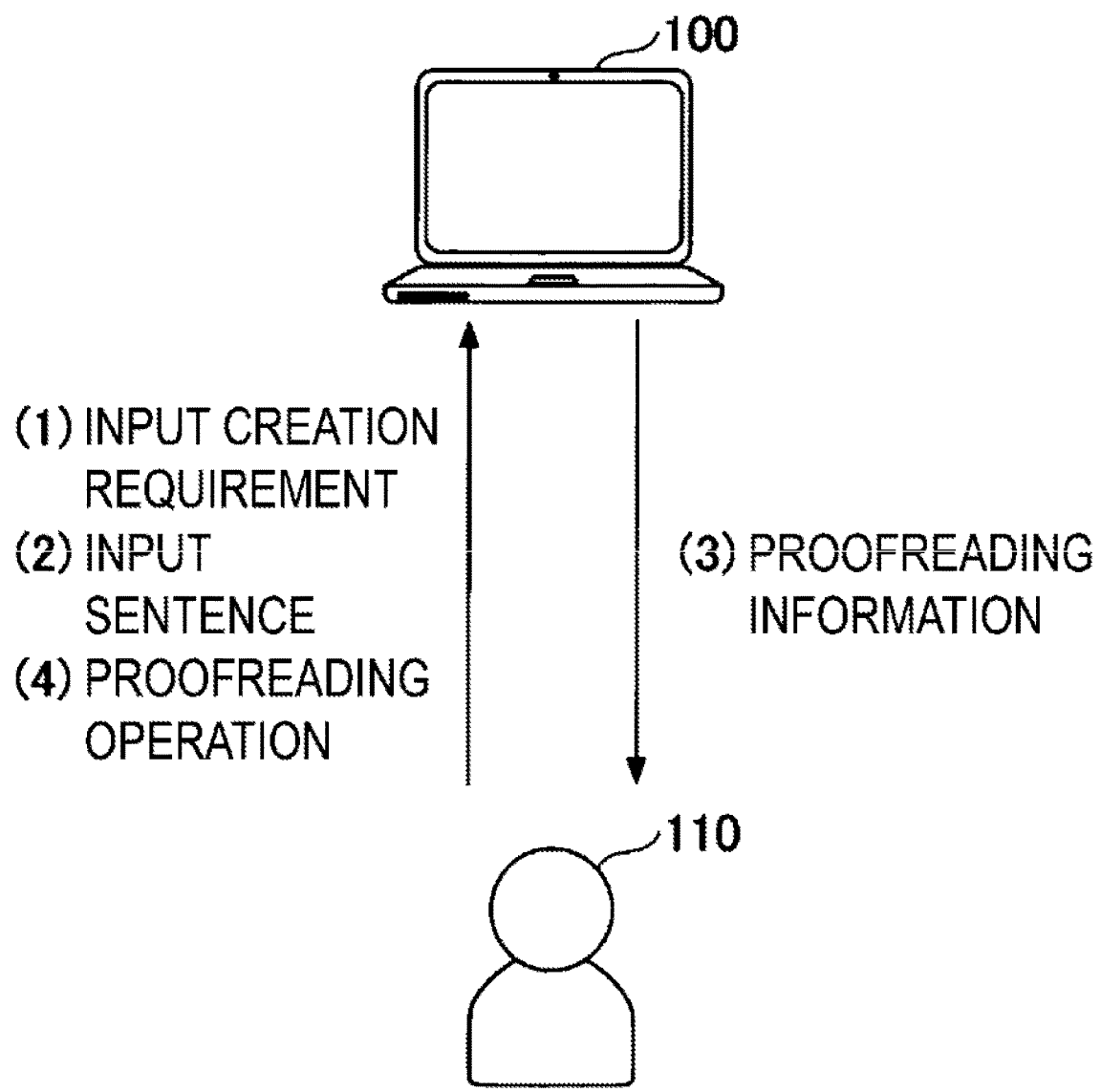
FIG. 1 is a diagram illustrating an example of a utilization scene of a sentence proofreading assistance apparatus.

Hereinafter, embodiments will be described with reference to the accompanying drawings. The present description and drawings omit duplicate description for components having substantially the same functional configuration by adding the same reference numerals.

First Embodiment

Utilization Scene of Sentence Proofreading Assistance Apparatus

First, a utilization scene of a sentence proofreading assistance apparatus according to a present embodiment will be described. FIG. 1 is a diagram illustrating an example of the utilization scene of the sentence proofreading assistance apparatus. As illustrated in FIG. 1, a user 110 first inputs a "creation requirement" of a picture book to a sentence proofreading assistance apparatus 100 (see (1)). The creation requirement of the picture book here includes
a "development level of a target person (child)" for which a picture book to be created is intended, and
a "purpose of creating the picture book" to be created.

The development level of a child refers to an index related to an understanding level of a sentence or a development degree of a language, such as a difficulty level or a target age of a picture book. However, the index here does not need to be quantitatively expressed but may be qualitatively expressed as "capable of understanding a language", "having 10 or more utterable words", "capable of continuing listening to reading of a picture book", or "having a theory of mind".

The purpose of creating the picture book indicates what effect is desirably acquired when a child reads the picture book to be created (or the picture book to be created is read to the child). The purpose of creating the picture book in the present embodiment includes delighting a child,
    communicating with a child,
    bringing out a child's adorable appearance or the like,
    knowing interests and concerns of a child,
    encouraging and realizing growth and development of a child.

The user 110 then inputs a sentence to be inserted into the picture book (see (2)). The sentence proofreading assistance apparatus 100 analyzes the sentence input by the user 110. The sentence proofreading assistance apparatus 100 further checks an analysis result in accordance with a check content corresponding to the creation requirement of the picture book and presents proofreading information based on a rule corresponding to the creation requirement of the picture book to the user 110 (see (3)). This enables the user 110 to perform proofreading operation suitable for the creation requirement each time a sentence is input (see (4)). The proofreading information is for proofreading a sentence and includes an alert and an exaggeration candidate as described below.

Figure 2:
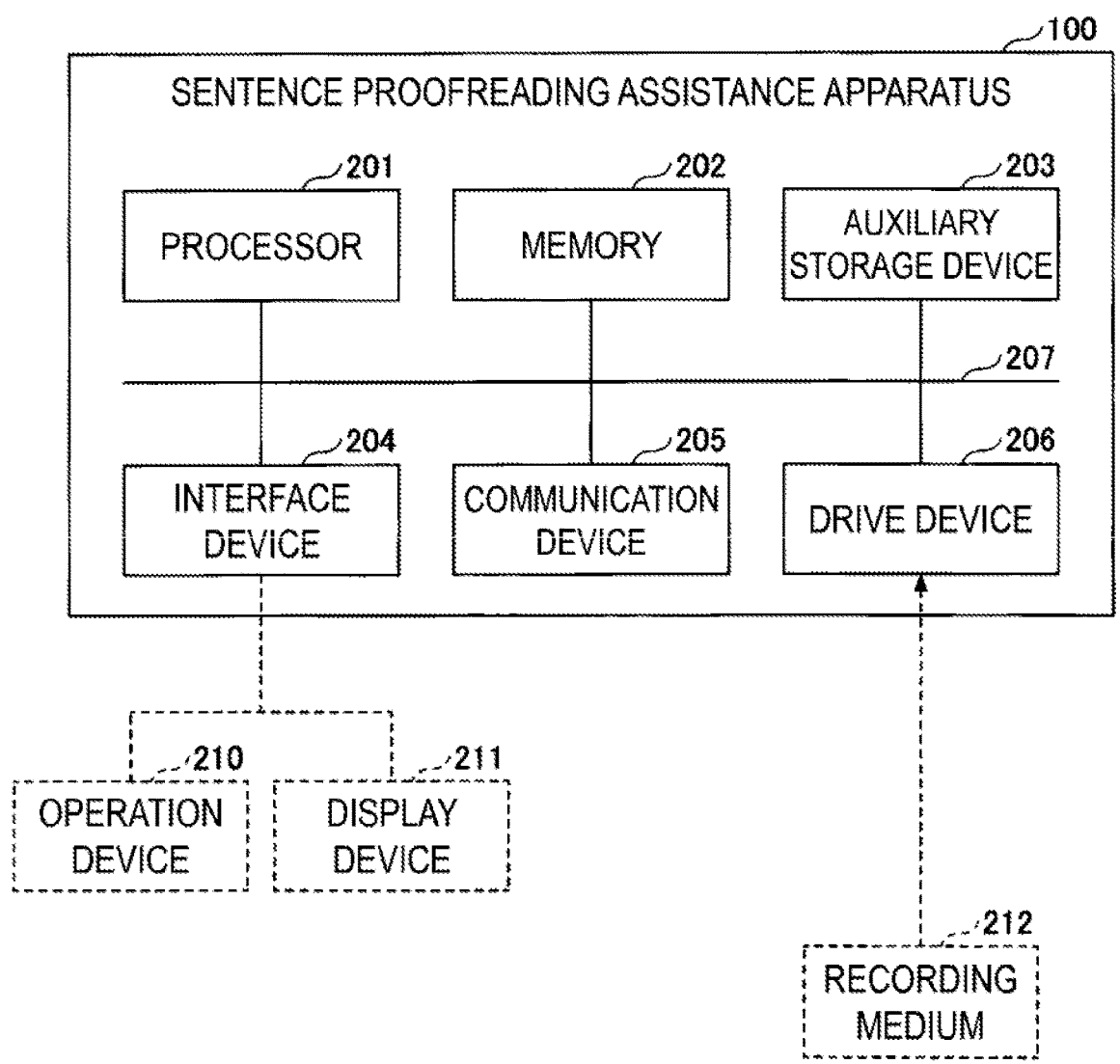
FIG. 2 is a diagram illustrating an example of a hardware configuration of the sentence proofreading assistance apparatus.

Hardware Configuration of Sentence Proofreading Assistance Apparatus Next, a hardware configuration of the sentence proofreading assistance apparatus 100 will be described. FIG. 2 is a diagram illustrating an example of the hardware configuration of the sentence proofreading assistance apparatus 100. As illustrated in FIG. 2, the sentence proofreading assistance apparatus 100 includes a processor 201, a memory 202, an auxiliary storage device 203, an interface (I/F) device 204, a communication device 205, and a drive device 206. The hardware components of the sentence proofreading assistance apparatus 100 are connected to each other via a bus 207.

The processor 201 includes various arithmetic devices such as a central processing unit (CPU) and a graphics processing unit (GPU). The processor 201 reads and executes various programs (for example, a sentence proofreading assistance program described below) on the memory 202.

The memory 202 includes main storage devices such as a read only memory (ROM) and a random access memory (RAM). The processor 201 and the memory 202 form a so-called computer and the computer implements various functions by the processor 201 executing various programs read on the memory 202.

The auxiliary storage device 203 stores various programs and various data used when the various programs are executed by the processor 201. For example, a creation requirement DB storage unit 370 and a check DB storage unit 380 described below are implemented in the auxiliary storage device 203.

The I/F device 204 is a connection device for connecting the sentence proofreading assistance apparatus 100 with the operation device 210 and the display device 211 which are examples of external devices. The I/F device 204 accepts operation for the sentence proofreading assistance apparatus 100 (e.g., input of a creation requirement, input of a sentence, input of proofreading operation) via the operation device 210. The I/F device 204 also outputs a result of processing (e.g., proofreading information) by the sentence proofreading assistance apparatus 100 and displays the result on the display device 211.

The communication device 205 is a communication device for communicating with other devices via a network.

The drive device 206 is a device for setting a recording medium 212 therein. The recording medium 212 referred to here includes a medium that records information optically. electrically, or magnetically such as a CD-ROM, a flexible disk, or a magneto-optical disc. The recording medium 212 may also include a semiconductor memory or the like that electrically records information such as a ROM or a flash memory.

Various programs are installed in the auxiliary storage device 203, for example, by setting a distributed recording medium 212 in the drive device 206 and reading the various programs recorded in the recording medium 212 by the drive device 206. Alternatively, various programs may be installed in the auxiliary storage device 203 by being downloaded from the network via the communication device 205.

Functional Configuration of Sentence Proofreading Assistance Apparatus

Figure 3:
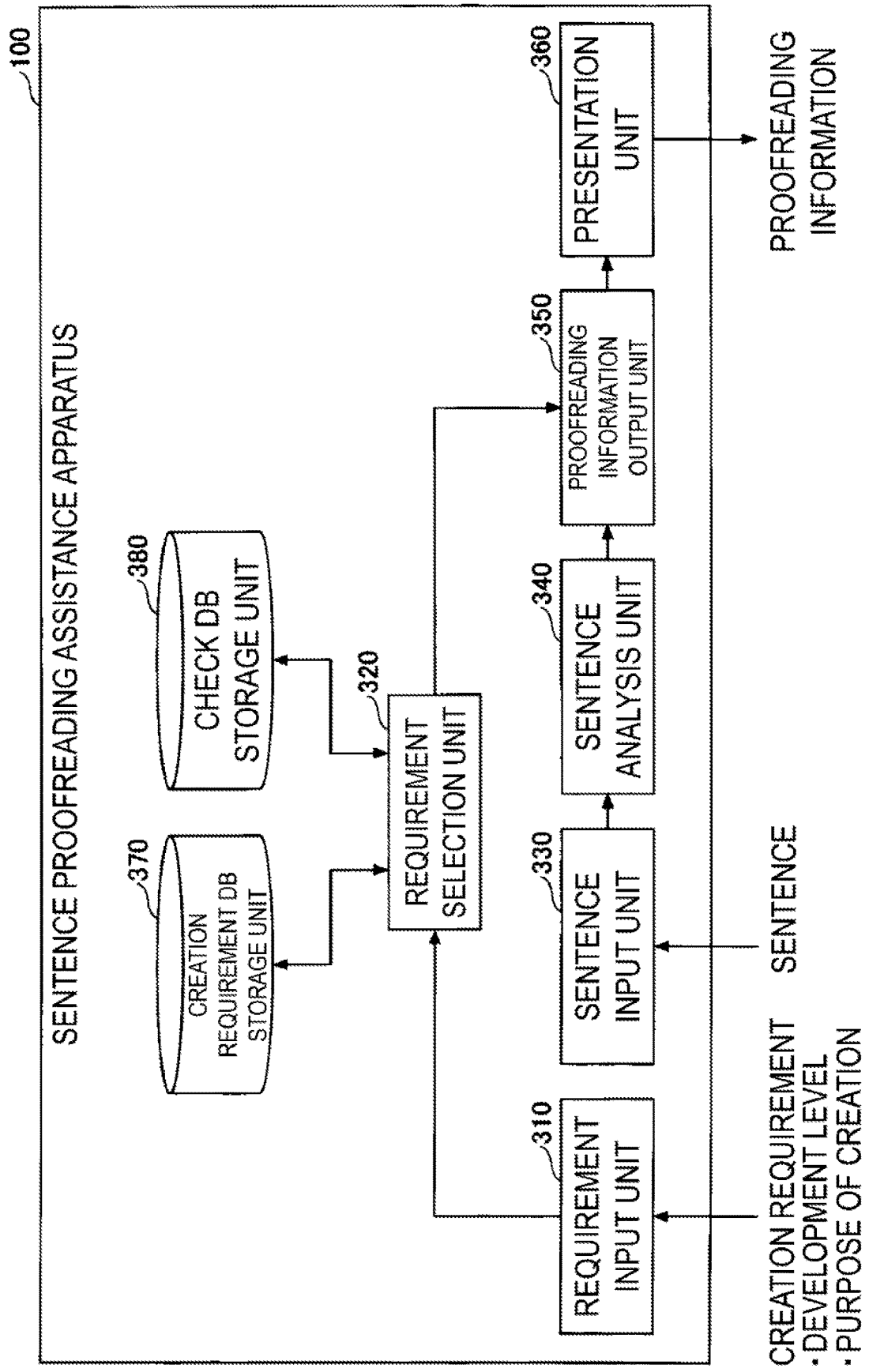
FIG. 3 is a diagram illustrating an example of a functional configuration of the sentence proofreading assistance apparatus.

Next, a functional configuration of the sentence proofreading assistance apparatus 100 will be described. FIG. 3 is a diagram illustrating an example of the functional configuration of the sentence proofreading assistance apparatus. As described above, the sentence proofreading assistance program is installed in the sentence proofreading assistance apparatus 100, and the sentence proofreading assistance apparatus 100 operates as a requirement input unit 310 and a requirement selection unit 320 by executing the sentence proofreading assistance program. In addition, the sentence proofreading assistance apparatus 100 operates as a sentence input unit 330, a sentence analysis unit 340, a proofreading information output unit 350, and a presentation unit 360.

The requirement input unit 310 accepts the creation requirement input by the user 110. As described above, the creation requirement includes the development level of a child, the purpose of creating a picture book, and the requirement input unit 310 displays options of development levels of a child for the user 110 and notifies the requirement selection unit 320 of a development level suitable for an option selected by the user 110. Similarly, the requirement input unit 310 displays options of purposes of creating a picture book for the user 110 and notifies the requirement selection unit 320 of a creation purpose suitable for an option selected by the user 110.

The requirement selection unit 320 is an example of an acquisition unit. The requirement selection unit 320 refers to the creation requirement DB storage unit 370 when notified of the development level of the child and the purpose of creating the picture book by the requirement input unit 310.

The creation requirement DB storage unit 370 stores a creation requirement database (hereinafter, referred to as the creation requirement DB). The creation requirement DB includes first classifications classified in accordance with development levels of a child, and second classifications classified in accordance with purposes of creating a picture book, in which information indicating a check database (hereinafter, referred to as a check DB) is specified for each of combinations of the first and second classifications.

The requirement selection unit 320 acquires information indicating a check DB from the creation requirement DB, based on a combination of a first classification corresponding to the development level of the child of which the requirement selection unit 320 is notified and a second classification corresponding to the purpose of creating the picture book of which the requirement selection unit 320 is notified.

Furthermore, the requirement selection unit 320 refers to the check DB storage unit 380 based on the acquired information indicating the cheek DB. The check DB storage unit 380 stores a plurality of check DBs, and the requirement selection unit 320 acquires a check content and a rule from a check DB corresponding to the acquired information indicating the check DB. In addition, the requirement selection unit 320 notifies the proofreading information output unit 350 of the acquired cheek content and rule. The check DB specifies a check content for checking an analysis result of a sentence and a rule for generating proofreading information output when it is determined that a predetermined condition is satisfied as a result of checking with the check content.

When the user 110 inputs a sentence to be inserted into the picture book, the sentence input unit 330 accepts the sentence, and notifies the sentence analysis unit 340 of the input sentence. The sentence input unit 330 may accept a sentence input by the user 110 via the operation device 210 such as a keyboard or may receive a sentence created in advance via the communication device 205 to accept the sentence. Alternatively, the sentence input unit 330 may read a sentence stored in advance in the recording medium 212 via the drive device 206 to accept the sentence.

The sentence analysis unit 340 analyzes the sentence of which the sentence analysis unit 340 is notified by the sentence input unit 330 and notifies the proofreading information output unit 350 of an analysis result. In the analysis of the sentence, the sentence analysis unit 340 performs processing such as
- determining which the sentence has, a simple sentence structure or a complex sentence structure,
- dividing the sentence by each clause and counting the number of clauses,
- determining parts of speech of words included in each clause,
- determining whether a predetermined word is included, or the like, and obtains the analysis result.

The proofreading information output unit 350 checks the analysis result obtained by analyzing the sentence based on the check content and generates and outputs proofreading information for proofreading the sentence based on the rule when it is determined that the predetermined condition is satisfied.

The presentation unit 360 presents the proofreading information output by the proofreading information output unit 350 to the user 110.

Specific Example of Creation Requirement DB

Next, a specific example of the creation requirement DB stored in the creation requirement DB storage unit 370 will be described. FIG. 4 is a diagram illustrating an example of the creation requirement DB. As illustrated in FIG. 4, a creation requirement DB 400 includes first classifications classified (in the example in FIG. 4, classified by one year old) in accordance with the development levels of a child (in the example in FIG. 4, a target age) in a lateral direction. On the other hand, the creation requirement DB 400 includes second classifications classified (in the example in FIG. 4, classified by one purpose of creation) in accordance with the creation purposes of a picture book (in the example in FIG. 4, five purposes of creation) in a longitudinal direction.

Furthermore, in the creation requirement DB 400, information indicating a check DB is specified for each of combinations of the first and second classifications. For example, for a combination of a first classification-"1 year old" and a second classification-"delighting child", a "check DB-1" and a "check DB-17" are specified as the information indicating the check DB.

Furthermore, in the creation requirement DB 400, a qualitative description is specified for each of combinations of the first and second classifications. For example, for the combination of the first classification-"1 year old" and the second classification-"delighting child", "difficulty level of sentence is very low" and "sentence has a rhythmic sense" are specified.

Specific Example of Check DB

Next, a specific example of the check DB stored in the check DB storage unit 380 will be described. FIG. 5 is a diagram illustrating an example of the check DB. Of two check DBs illustrated in FIG. 5, a check DB 510 corresponds to the "check DB-1" in the creation requirement DB 400, and a check DB 520 corresponds to the "check DB-17" in the creation requirement DB 400.

As illustrated in FIG. 5, the check DBs 510, 520 include a "check item", a "check content", and a "rule" as items of information.

The "check item" specifies a check item used in checking an analysis result of a sentence. The check DB 510 shows that a sentence structure is checked in the analysis result of the sentence, and the check DB 520 shows that presence or absence of a particular word is checked in the analysis result of the sentence.

The "check content" specifies a check content used in checking an analysis result of a sentence. In the example of the check DB 510, it is specified to check whether the complex sentence structure is included and to check the number of clauses. On the other hand, in the example of the check DB 520, it is specified to check presence or absence of an adjective and an adverb, or presence or absence of a particular word (dog, cat, get angry, eat, go through, warm, gentle, or the like).

The "rule" specifies a rule for generating proofreading information (alert, exaggeration candidate) to be output in a case where it is determined that a predetermined condition is satisfied as a result of checking based on the check content.

According to the check DB 510, in a case where it is determined that the complex sentence structure is included, an alert ("sentence is too complex") is output as the proofreading information. In addition, according to the check DB 510, in a case where the number of clauses is seven or more, an alert ("sentence is too long") is output as the proofreading information.

In this manner, according to the check DB 510, it is possible to determine whether a sentence is suitable for a development level of a child by checking the sentence structure. In addition, an alert can be output when it is determined that the sentence is not suitable for the development level of the child. As a result, it is possible to proofread the sentence to be suitable for the development level of the child.

On the other hand, according to the check DB 520, in a case where it is determined that an adjective is included, an exaggeration candidate in which the adjective is repeated twice is output as the proofreading information. In addition, according to the check DB 520, in a case where it is determined that an adverb is included, an exaggeration candidate in which the adverb is repeated twice is output as the proofreading information. Furthermore, according to the check DB 520, in a case where it is determined that a particular word is included, an exaggeration candidate in which a predetermined onomatopoeia is added is output as the proofreading information.

In this way, according to the check DB 520, it is possible to determine whether the sentence is suitable for the purpose of creating the picture book by checking presence or absence of a particular word. In addition, in a case where it is determined that the sentence is not suitable for the purpose of creating the picture book, it is possible to output an exaggeration candidate in which a way of using words or a way of representing the sentence is changed. As a result, it is possible to perform proofreading to a sentence suitable for the purpose of creating the picture book (here, "delighting child").

Flow of Sentence Proofreading Assistance Processing

Figure 6:
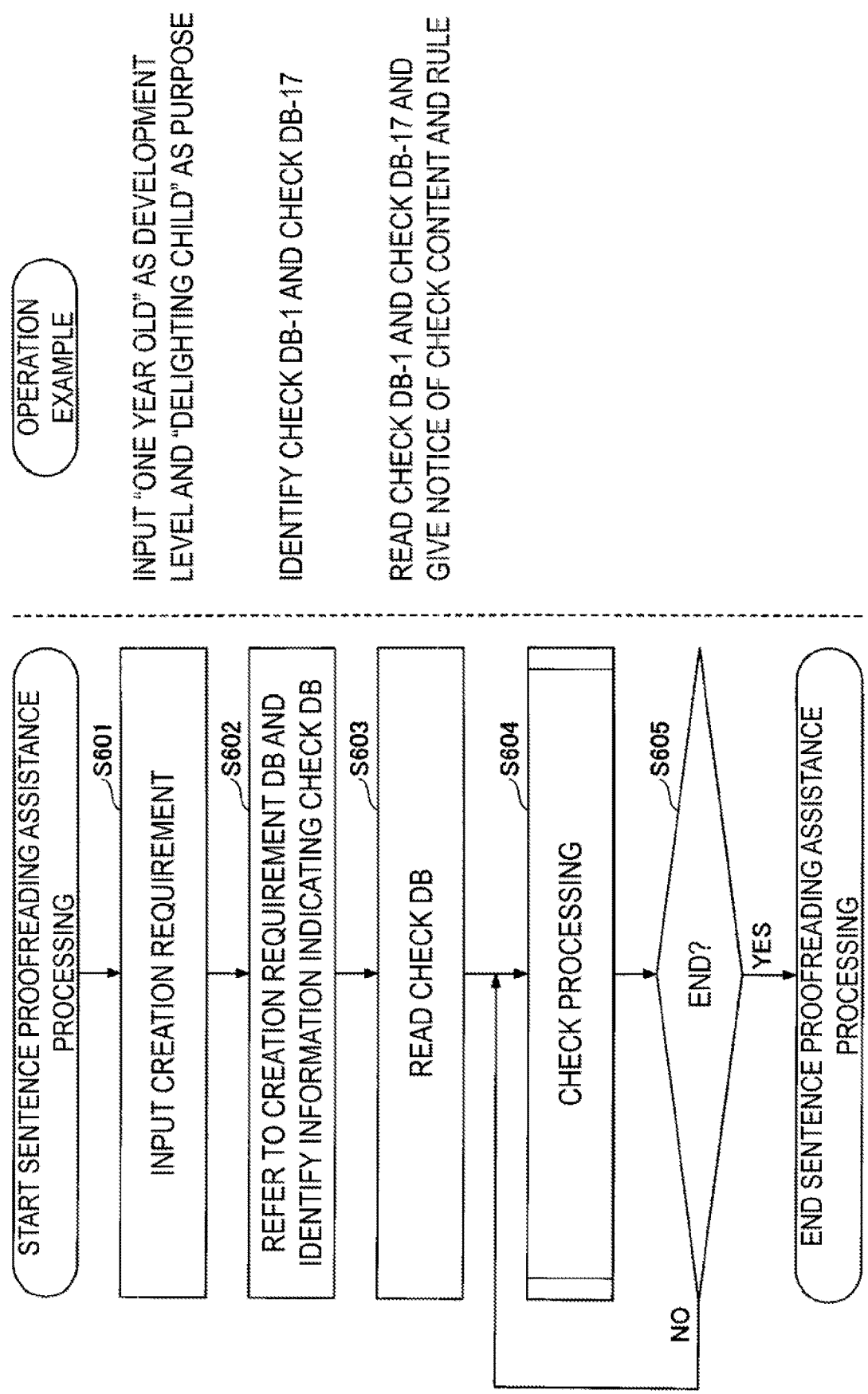
FIG. 6 is a flowchart illustrating a flow of sentence proofreading assistance processing and a diagram illustrating an operation example.

Next, a flow of sentence proofreading assistance processing by the sentence proofreading assistance apparatus 100 will be described in association with a specific operation example. FIG. 6 is a flowchart illustrating a flow of sentence proofreading assistance processing and a diagram illustrating an operation example.

In step S601, the requirement input unit 310 accepts the creation requirement input by the user 110. The operation example in FIG. 6 indicates that the user 110 inputs "one year old" as the development level of a child and inputs "delighting child" as the purpose of creating a picture book.

In step S602, the requirement selection unit 320 refers to the creation requirement DB of the creation requirement DB storage unit 370 and identifies information indicating a check DB corresponding to the input creation requirement. The operation example in FIG. 6 indicates that the requirement selection unit 320 refers to the creation requirement DB 400 and identifies the check DB-1 and the check DB-17 as the check DB corresponding to the development level of the child of "one year old" and the purpose of creating the picture book of "delighting child".

In step S603, the requirement selection unit 320 reads the cheek DB from the check DB storage unit 380 based on information indicating the identified check DB and acquires a check content and a rule. In addition, the requirement selection unit 320 notifies the proofreading information output unit 350 of the acquired check content and rule. The operation example in FIG. 6 indicates that the requirement selection unit 320 reads the check DB-1 and the check DB-17 and notifies the proofreading information output unit 350 of the check content and the rule.

In step S604, the sentence input unit 330, the sentence analysis unit 340, the proofreading information output unit 350, and the presentation unit 360 execute "check processing" of checking the analysis result of the sentence input by the user 110 based on the check content and presenting proofreading information. The detailed flow of the check processing will be described below together with a specific operation example.

In step S605, the sentence input unit 330 determines whether to end the sentence proofreading assistance processing, and in a case where it is determined not to end the sentence proofreading assistance processing (NO in step S605), the processing returns to step S604. On the other hand, in a case where it is determined to end the sentence proofreading assistance processing (YES in step S605), the processing is ended.

Flow of Check Processing

Figure 7:
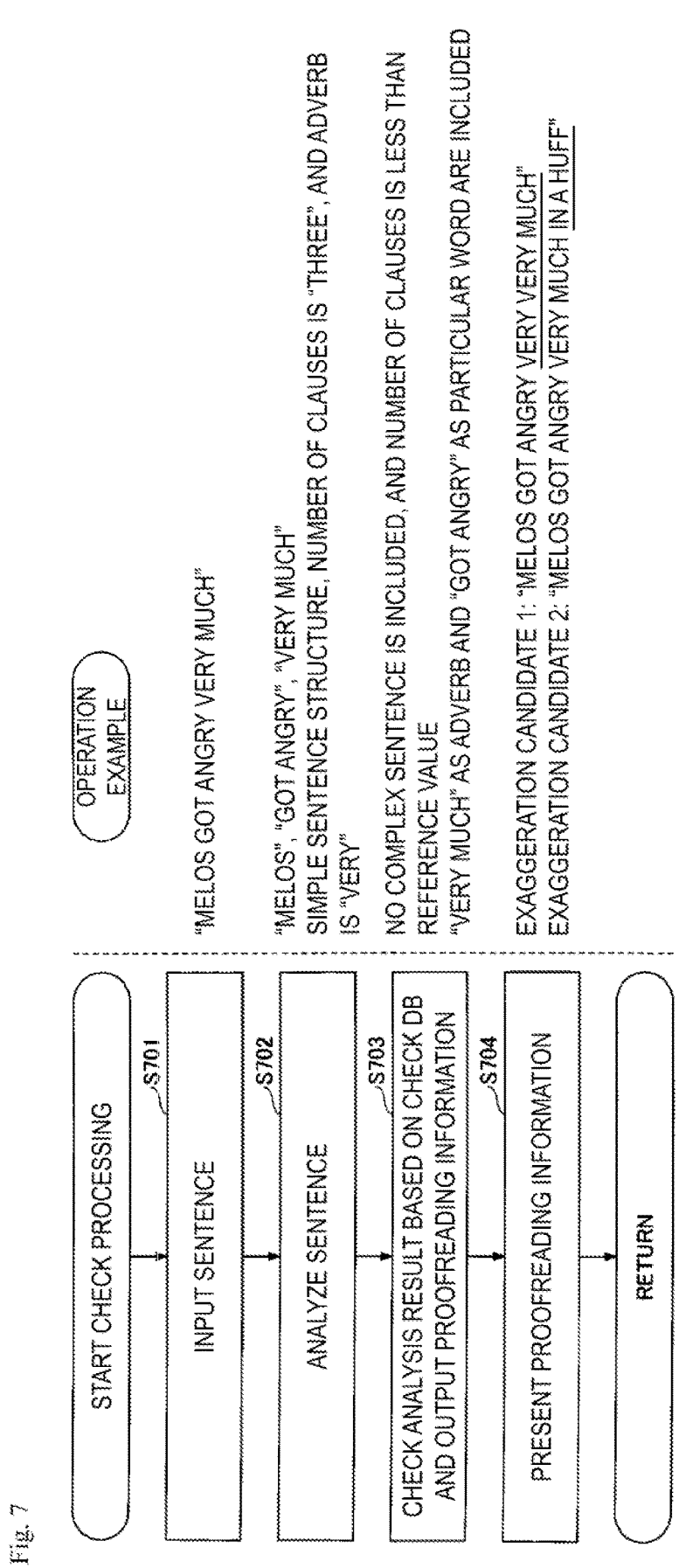
FIG. 7 is a flowchart illustrating a flow of check processing and a diagram illustrating an operation example.

Next, a detailed flow of the cheek processing (step S604) and an operation example in FIG. 6 will be described. FIG. 7 is a flowchart illustrating the flow of the check processing and a diagram illustrating the operation example.

In step S701, the sentence input unit 330 accepts a sentence input by the user 110. The operation example in FIG. 7 indicates that the user 110 inputs a sentence of "Melos got angry very much".

In step S702, the sentence analysis unit 340 analyzes the input sentence. The operation example in FIG. 7 indicates that as a result of analyzing the input sentence, the sentence analysis unit 340 determines that it has a simple sentence structure. In addition, the operation example in FIG. 7 indicates that the sentence analysis unit 340 divides the input sentence by each clause ("Melos", "got angry", and "very much") and determines that the number of clauses is "three". Furthermore, the operation example in FIG. 7 indicates that the sentence analysis unit 340 determines that the input sentence includes an adverb "very".

In step S703, the proofreading information output unit 350 checks the analysis result based on the check content and outputs proofreading information based on the rule in a case where a predetermined condition is satisfied. The operation example in FIG. 7 indicates that the proofreading information output unit 350 checks the analysis result based on the check content of the check DB-1 to determine that the input sentence does not have a complex sentence structure and that the number of clauses is less than a reference value. In this case, the proofreading information output unit 350 determines that the predetermined condition is not satisfied.

In addition, the operation example in FIG. 7 indicates that the proofreading information output unit 350 checks the analysis result based on the check content of the check DB-17 to determine that the input sentence includes the adverb "very much" and a particular word "got angry". In this case, the proofreading information output unit 350 determines that the predetermined condition is satisfied, and outputs proofreading information based on the rule of the check DB-17.

In step S704, the presentation unit 360 presents the proofreading information output by the proofreading information output unit 350 to the user 110. The operation example in FIG. 7 indicates that, as the proofreading information, an exaggeration candidate 1 "Melos got angry very very much", and an exaggeration candidate 2 "Melos got angry very much in a huff" are presented.

The check processing (step S604) is executed in this manner, and the exaggeration candidates 1, 2 are presented to the user 110 as the proofreading information, so that the user 110 can perform the proofreading operation on the sentence input by himself herself based on the presented exaggeration candidates 1, 2. As a result, the user 110 can proofread the sentence input by himself herself to a sentence suitable for the development level of the child and the purpose of creating the picture book, and make the picture book to be created closer to a "good picture book".

Other Operation Examples

Next, other operation examples of the check processing (step S604) will be described. FIG. 8 is a diagram illustrating other operation examples of the check processing. It is also assumed here that the user 110 inputs the development level of a child of "one year old" and the purpose of creating a picture book of "delighting child" as the creation requirement and thus the check DB-1 and the check DB-17 are read.

Among the operation examples illustrated in FIG. 8, an operation example 810 indicates that the user 110 inputs a sentence "there is no one but this man under the wide gate".

In this case, the sentence analysis unit 340 determines that the input sentence has a simple sentence structure. In addition, the sentence analysis unit 340 divides the input sentence by each clause ("there is". "no one". "but". "this". "man", "under". "the wide", and "gate") and determines that the number of clauses is "eight". Furthermore, the sentence analysis unit 340 determines that an adjective "wide" is included in the input sentence.

The proofreading information output unit 350 checks the analysis result based on the check content of the check DB-1, determines that no complex sentence is included, and determines that the number of clauses is equal to or greater than a reference value. Thus, the proofreading information output unit 350 determines that the predetermined condition is satisfied, and outputs proofreading information based on the rule of the check DB-1. As a result, the presentation unit 360 presents an alert 2 "sentence is too long" as proofreading information.

In addition, the proofreading information output unit 350 checks the analysis result based on the cheek content of the check DB-17 and determines that an adjective is included. Thus, the proofreading information output unit 350 determines that the predetermined condition is satisfied, and outputs the proofreading information based on the rule of the check DB-17. As a result, the presentation unit 360 presents an exaggeration candidate 1 "there is no one but this man under the wide wide gate" as the proofreading information.

On the other hand, an operation example 820 indicates that the user 110 inputs a sentence "when going through the long tunnel in the border, I saw the snow country".

In this case, the sentence analysis unit 340 determines that the input sentence has a complex sentence structure. In addition, the sentence analysis unit 340 divides the input sentence by each clause ("when going through". "the long", "tunnel". "I saw", and "the snow country") and determines that the number of clauses is "six". Furthermore, the sentence analysis unit 340 determines that the input sentence includes an adjective "long".

The proofreading information output unit 350 checks the analysis result based on the check content of the check DB-1, determines that a complex sentence is included, and determines that the number of the clauses is less than the reference value. From this, the proofreading information output unit 350 determines that the predetermined condition is satisfied, and outputs proofreading information based on the rule of the check DB-1. As a result, the presentation unit 360 presents an alert 1 "sentence is complex" as proofreading information.

In addition, the proofreading information output unit 350 checks the analysis result based on the check content of the check DB-17 and determines that an adjective is included. From this, the proofreading information output unit 350 determines that the predetermined condition is satisfied, and outputs the proofreading information based on the rule of the check DB-17. As a result, the presentation unit 360 presents an exaggeration candidate 1 "when going through the long long tunnel in the border, I saw the snow country" as proofreading information. In addition, the presentation unit 360 presents an exaggeration candidate 2 "when going through the long tunnel on and on in the border, I saw the snow country" as proofreading information. Furthermore, the presentation unit 360 presents an exaggeration candidate 3 "when going through the long tunnel in the border with a pop. I saw the snow country" as proofreading information.

Summary

As is clear from the above description, the sentence proofreading assistance apparatus 100 according to the first embodiment performs the following.
Inputting a development level of a child and a purpose of creating a picture book as a creation requirement.
Referring to a creation requirement DB to identify information indicating a check DB corresponding to the creation requirement input by the requirement input unit, and acquiring a check content and a rule corresponding to the input creation requirement.
In a case where a sentence of the picture book to be proofread is input, analyzing the sentence of the picture book.
Checking the analysis result of the sentence based on the check content, and in a case where it is determined that a predetermined condition is satisfied, outputting proofreading information based on the rule.

In this way, the analysis result of the sentence is checked in consideration of the purpose of creating the picture book in addition to the development level of the child, and the proofreading information based on the rule suitable for the purpose of creating the picture book is output, so that it is possible to perform proofreading to a sentence suitable for the creation purpose and make the picture book closer to a "good picture book".

That is, according to the first embodiment, it is possible to provide a sentence proofreading assistance apparatus, a sentence proofreading assistance method, and a sentence proofreading assistance program that appropriately assist in sentence proofreading when creating a picture book.

Second Embodiment

In the first embodiment described above, the description has been made assuming that the check DB is stored in advance in the check DB storage unit 380. In contrast, in a second embodiment, a preparation procedure of a cheek DB will be described.

Figure 9:
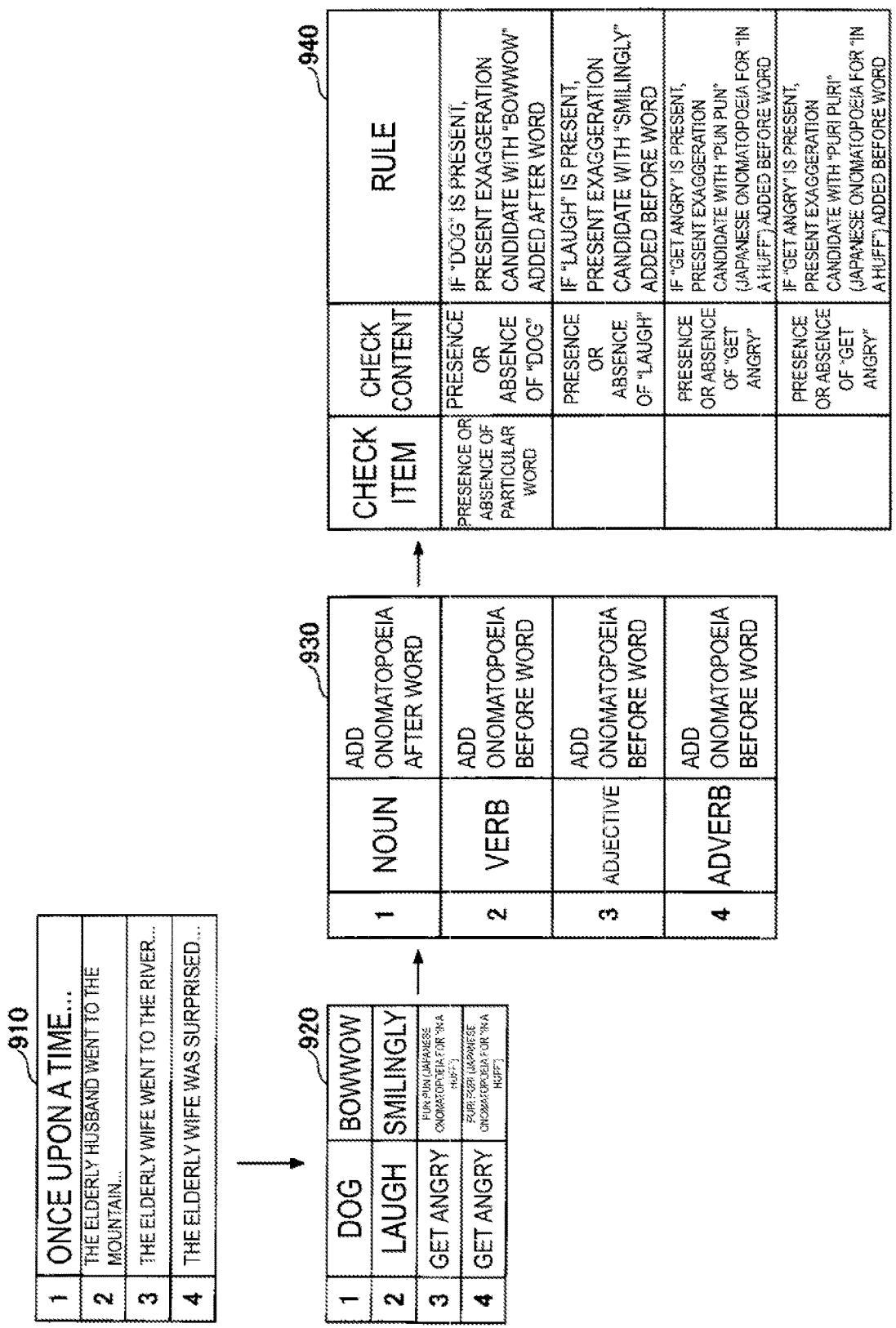
FIG. 9 is a diagram illustrating an example of a creation procedure of the check DB.

FIG. 9 is a diagram illustrating an example of a preparation procedure of a check DB and is a diagram illustrating a preparation procedure of the check DB-17 described in the first embodiment. As illustrated in FIG. 9, the check DB-17 is prepared in the following procedure.

i) Collect sentences 910 included in an existing picture book.
ii) Extract, among words included in the sentences 910, a word with a high co-occurrence probability and an onomatopoeia to generate a combination table 920 of words with high co-occurrence probability and onomatopoeias. The combination table 920 may associate one onomatopoeia with one word or may associate a plurality of onomatopoeias with one word.
iii) Generate a table 930 in which a provision method when providing an onomatopoeia to a word with a high co-occurrence probability is specified for each part of speech.
iv) Store a word in the table 920 in "check content" and store the associated onomatopoeia and the associated provision method of the onomatopoeia in "rule" to generate the check DB-17 (check DB 940).

In this way, it is possible to generate an appropriate check DB by analyzing an existing picture book.

Other Embodiments

In the first embodiment, a case where the check DB corresponding to the development level of the child and the check DB corresponding to the purpose of creating the picture book are separately specified (check DB-1, check DB-17) in the creation requirement DB 400 has been described.

However, the check DB specified in the creation requirement DB 400 may be one check DB corresponding to both the development level of a child and the purpose of creating a picture book (e.g., check DB-4 to check DB-16, or the like).

Furthermore, in the first embodiment described above, the purpose of creating a picture book is classified into five, but the classified number in the second classifications of the creation requirement DB may be less than five or six or more.

In addition, although in the first embodiment described above, in the check processing (step S604), the description has been given assuming that the proofreading information is presented every time the user 110 inputs one sentence, a configuration may be made in such a manner that proofreading information is collectively presented every time a plurality of sentences is input.

Moreover, although in the first embodiment described above, the description has been given assuming that a sentence is input after the creation requirement is input, a creation requirement may be input after a sentence is input (or the creation requirement may be changed in the middle of sentence input). In this case, the check processing is performed for all sentences that have already been input, and the check processing is also performed for a sentence that is input after the creation requirement is input (or changed).

The present invention is not limited to the configurations shown here, which include the configurations or the like described in the above embodiments, combinations thereof with other elements, and the like. In this regard, configurations can be changed without departing from the spirit of the present invention and can be appropriately determined according to the application form thereof.

REFERENCE SIGNS LIST

100: Sentence proofreading assistance apparatus
310: Requirement input unit
320: Requirement selection unit
330: Sentence input unit
340: Sentence analysis unit
350: Proofreading information output unit
360: Presentation unit
370: Creation requirement DB storage unit
380: Check DB storage unit
400: Creation requirement DB
510: Check DB
520: Check DB

The invention claimed is:

1. A sentence proofreading assistance apparatus, comprising:
  a processor; and
  a memory storing program instructions that cause the processor to:
  display options of ages, as development levels, including one year old, two years old, three years old, four years old, and five years old or older of a target person of a picture book and options of purposes of creating the picture book for a user of each of the options of ages to select, said purposes including delighting, communicating, knowing child's interests and concerns, and encouraging and realizing child's growing and development,
  receive a selected age of the target person and a selected purpose of creating the picture book;
  acquire a check content and a rule corresponding to the selected age and the selected purpose;
  accept a sentence to be inserted to the picture book;
  analyze, when receiving the sentence of a picture book to be proofread, the sentence of the picture book; and
  check an analysis result in accordance with the check content and output proofreading information based on the rule for proofreading the sentence,
  wherein the sentence proofreading assistance further comprises
  a database in which the check content and the rule are specified per combination of a first classification classified in accordance with the development level of the target person and a second classification classified for each purpose of creating the picture book, and
  wherein the program instructions further cause the processor to acquire a check content and a rule corresponding to a combination identified by the both pieces of the information.

2. The sentence proofreading assistance apparatus according to claim 1, wherein
  information on the development level of the target person includes the age or a difficulty level of the picture book.

3. The sentence proofreading assistance apparatus according to claim 1, wherein
  the purpose of creating the picture book includes information indicating an effect obtained by the target person reading the picture book, or an effect obtained by reading the picture book to the target person.

4. The sentence proofreading assistance apparatus according to claim 1, wherein the sentence of the picture book is analyzed by at least one of:
  determining whether the sentence has a simple sentence structure or a complex sentence structure,
  dividing the sentence by each clause and counting the number of clauses,
  determining parts of speech of words included in each divided clause, or
  determining whether a predetermined word is included in the sentence.

5. A sentence proofreading assistance method, comprising:
  displaying options of ages, as development levels, including one year old, two years old, three years old, four years old, and five years old or older of a target person of a picture book and options of purposes of creating the picture book for a user of each of the options of ages to select, said purposes including delighting, communicating, knowing child's interests and concerns, and encouraging and realizing child's growing and development;
  receiving a selected development level of the target person and a selected purpose of creating the picture book;
  acquiring a check content and a rule corresponding to the selected age and the selected purpose received by the receiving;
  accepting a sentence to be inserted to the picture book;
  analyzing, when receiving the sentence of the picture book to be proofread, the sentence of the picture book; and
  checking an analysis result in the analyzing in accordance with the check content and outputting proofreading information based on the rule for proofreading the sentence,
  wherein the sentence proofreading assistance further comprises
  a database in which the check content and the rule are specified per combination of a first classification classified in accordance with the development level of the target person and a second classification classified for each purpose of creating the picture book, and wherein the method further comprises acquiring a check content and a rule corresponding to a combination identified by the both pieces of the information.

6. The sentence proofreading assistance method according to claim 5, wherein information on the development level of the target person includes the age or a difficulty level of the picture book.

7. The sentence proofreading assistance method according to claim 5, wherein
the purpose of creating the picture book includes information indicating an effect obtained by the target person reading the picture book, or an effect obtained by reading the picture book to the target person.

8. The sentence proofreading assistance method according to claim 5, wherein the sentence of the picture book is analyzed by at least one of:
determining whether the sentence has a simple sentence structure or a complex sentence structure,
dividing the sentence by each clause and counting the number of clauses,
determining parts of speech of words included in each divided clause, or
determining whether a predetermined word is included in the sentence.

9. A non-transitory computer-readable recording medium storing a sentence proofreading assistance program for causing a computer to execute:
displaying options of ages, as development levels, including one year old, two years old, three years old, four years old, and five years old or older of a target person of a picture book and options of purposes of creating the picture book for a user of each of the options of ages to select, said purposes including delighting, communicating, knowing child's interests and concerns, and encouraging and realizing child's growing and development;
receiving a selected development level of the target person and a selected purpose of creating the picture book;
acquiring a check content and a rule corresponding to the selected age and the selected purpose received by the receiving;
accepting a sentence to be inserted to the picture book;
analyzing, when receiving the sentence of the picture book to be proofread, the sentence of the picture book; and
checking an analysis result in the analyzing in accordance with the check content and outputting proofreading information based on the rule for proofreading the sentence,
wherein the computer further comprises
a database in which the check content and the rule are specified per combination of a first classification classified in accordance with the development level of the target person and a second classification classified for each purpose of creating the picture book, and
wherein the sentence proofreading assistance program further causes the computer to execute acquiring a check content and a rule corresponding to a combination identified by the both pieces of the information.

10. The non-transitory computer-readable recording medium according to claim 9, wherein information on the development level of the target person includes the age or a difficulty level of the picture book.

11. The non-transitory computer-readable recording medium according to claim 9, wherein
the purpose of creating the picture book includes information indicating an effect obtained by the target person reading the picture book, or an effect obtained by reading the picture book to the target person.

12. The non-transitory computer-readable recording medium according to claim 9, wherein the sentence of the picture book is analyzed by at least one of:
determining whether the sentence has a simple sentence structure or a complex sentence structure,
dividing the sentence by each clause and counting the number of clauses,
determining parts of speech of words included in each divided clause, or
determining whether a predetermined word is included in the sentence.

* * * * *